United States Patent
Kerlin et al.

[19]

[11] Patent Number: 5,915,495
[45] Date of Patent: Jun. 29, 1999

[54] ENGINE AND TRANSAXLE MOUNTING AND SUSPENSION SYSTEM FOR A VEHICLE

[75] Inventors: James R. Kerlin, Evans, Ga.; J. Douglas Smith, Ocoee, Fla.

[73] Assignee: Club Car, Inc., Augusta, Ga.

[21] Appl. No.: 08/838,116

[22] Filed: Apr. 15, 1997

[51] Int. Cl.⁶ .................................................... B60K 1/00
[52] U.S. Cl. .......................................... 180/291; 280/781
[58] Field of Search .................................... 180/291–297, 180/377, 378; 280/781, 785, DIG. 5

[56] References Cited

U.S. PATENT DOCUMENTS

| | | |
|---|---|---|
| 2,001,029 | 5/1935 | Kulick et al. . |
| 2,756,834 | 7/1956 | Dauben . |
| 2,836,254 | 5/1958 | Boehner . |
| 4,263,980 | 4/1981 | Harlow, Jr. et al. . |
| 4,406,343 | 9/1983 | Harasaki . |
| 4,425,976 | 1/1984 | Kimura . |
| 4,773,675 | 9/1988 | Kosuge ................... 280/781 |
| 4,821,827 | 4/1989 | Reese . |
| 5,218,814 | 6/1993 | Teal et al. . |
| 5,277,270 | 1/1994 | Hasegawa . |
| 5,570,757 | 11/1996 | Courtwright et al. .................. 180/291 |
| 5,699,872 | 12/1997 | Miyakawa et al. ...................... 180/291 |
| 5,740,878 | 4/1998 | Sala ......................................... 180/291 |

FOREIGN PATENT DOCUMENTS

| | | | |
|---|---|---|---|
| 629109 | 10/1961 | Canada . | |
| 4208639 | 7/1992 | Japan ..................................... 180/291 |

*Primary Examiner*—Christopher P. Ellis
*Attorney, Agent, or Firm*—John J. Selko

[57] ABSTRACT

A carrier member for carrying the drive train components of a small, off-road, gasoline-powered vehicle. The carrier is a sheet metal structure having a base panel for carrying a small engine, a rear panel for carrying a transaxle that includes axle shafts extending to the rear drive wheels, and a front panel for receiving a front mount adapted to engage the vehicle frame at a transverse frame cross member. The carrier and associated drive train components constitute a unitized drive train assembly that is suspended from the frame by a pair of leaf springs or a pair of coil springs. Optionally, a torsion bar can be provided to minimize roll of the vehicle during turns. One embodiment of the suspension system includes a Watts link arrangement for minimizing side-to-side movement of the drive train assembly, and a ball-type front mount for connection of the drive train assembly with the vehicle frame in a manner to minimize transfer to the frame of vibrations and torque from the drive train assembly.

26 Claims, 15 Drawing Sheets

ENGINE AND TRANSAXLE MOUNTING AND SUSPENSION SYSTEM FOR A VEHICLE

BACKGROUND OF THE INVENTION

The present invention relates to a vehicle suspension system and to a vehicle drive train support structure for supporting a gasoline engine and associated power transmission and drive axle relative to the frame of a small motor vehicle, such as a gasoline-engine-powered golf car. More particularly, the present invention relates to a suspension system and to a drive train support structure for permitting a unitary assembly of the parts of the drive train for such a vehicle, including a carrier member for carrying the engine and transaxle components as a unitized drive train assembly and a suspension system for suspending the drive train assembly relative to the frame of the vehicle.

DESCRIPTION OF THE RELATED ART

In the past, vehicle engines were frequently mounted directly to mounting points forming part of the vehicle frame, usually by bolting the engine to the vehicle frame engine mount points with resilient vibration absorbers in order to attempt to minimize the transmission of engine vibrations to the frame. Another mounting arrangement, particularly for a front-mounted engine, front-wheel-drive vehicle having the engine and a transaxle coupled together, is a rectangular engine sub-frame composed of individual, interconnected box beam members. Such a structure is illustrated and described in U.S. Pat. No. 4,406,343, which issued on Sep. 27, 1983 to Hayathugu Harasaki.

A still further arrangement that also is particularly suited for front-wheel-drive vehicles is disclosed in U.S. Pat. No. 4,263,980, which issued on Apr. 28, 1981, to John H. Harlow, Jr., et al. That patent shows an engine cradle assembly intended for connection with the vehicle body and including disconnectable cross rails formed from channel members, wherein the cradle assembly is in the form of a rectangular frame.

Certain small, off-road vehicles, such as golf cars and small, general utility vehicles having engines of relatively low power rating, of the order of about five to ten horsepower, frequently also had their engines carried directly by the vehicle frame in the past. That arrangement, however, resulted in the transmission to the frame, and then to the occupants, of the vibrations resulting from the one to two cylinder engines with which such vehicles are usually powered. Engines of that small size and having only one or two cylinders generally vibrate at a larger amplitude than do larger engines having four, six, or eight cylinders, because the smaller the number of cylinders, the fewer the power strokes per engine revolution, resulting in more noticeable vibrations, particularly at low engine speeds.

One effective form of engine carrier for a small, off-road vehicle, such as a golf car, is the engine and transaxle support member disclosed in U.S. Pat. No. 4,821,827, which issued on Apr. 18, 1989, to Terry L. Reese, and which is assigned to the assignee of the present application. The support member therein disclosed is a tubular, U-shaped outer frame member, a pair of side-by-side, longitudinal engine support members, and a transverse angle member extending across the ends of the legs adjacent the open end of the U-shaped outer frame member. A unique front mount for mounting the support member to the vehicle body includes a large rubber grommet positioned between a pair of plates carried by the vehicle frame. The grommet-plate arrangement therein disclosed functions to more effectively isolate the engine vibrations from the vehicle frame, while providing support at the forward end of the U-shaped outer frame member.

It is an object of the present invention to provide an improved drive train carrier member for carrying and supporting a small gasoline engine and an associated transaxle, and including structure for supporting engine accessories.

It is a further object of the present invention to provide an improved suspension system for a small, off-road vehicle that includes the improved drive train carrier member.

SUMMARY OF THE INVENTION

Briefly stated, in accordance with one aspect of the present invention, an improved drive train support member is provided for supporting an engine and associated transaxle of a gasoline-engine-powered vehicle. The support member includes a base panel for receiving and mounting a gasoline engine. A first end panel extends transversely from a first end of the base panel in a first direction, the first end panel including mounting structure for receiving and mounting a transaxle adapted to be operatively connected with the engine. A second end panel extends transversely from a second end of the base panel substantially in the first direction and is spaced from the first end panel, the second end panel including mounting structure for receiving and mounting a vibration-isolating mount for connection with a vehicle frame.

In accordance with another aspect of the present invention, a vehicle drive train suspension arrangement is provided. An engine and interconnected transaxle are each connected with and carried on a drive train support member, the support member including a base panel for receiving and mounting a gasoline engine, a first end panel extending transversely from a first end of the base panel in a first direction, the end panel including mounting means for receiving and mounting a transaxle adapted to be operatively connected with the engine, and a second end panel extending transversely from a second end of the base panel substantially in the first direction and spaced from the first end panel. The second end panel includes mounting structure for receiving and mounting a vibration-isolating mount for connection with a vehicle frame connection. A spring extends between the vehicle frame and the drive train for resiliently suspending the drive train from the vehicle frame.

The present invention also includes alternative vehicle drive train suspension arrangements that include a torsion bar, coil springs, a Watts link, and a ball-and-socket-type of forward, vibration-isolating mount for the drive train support member.

DESCRIPTION OF THE PREFERRED EMBODIMENTS

Figure 1:
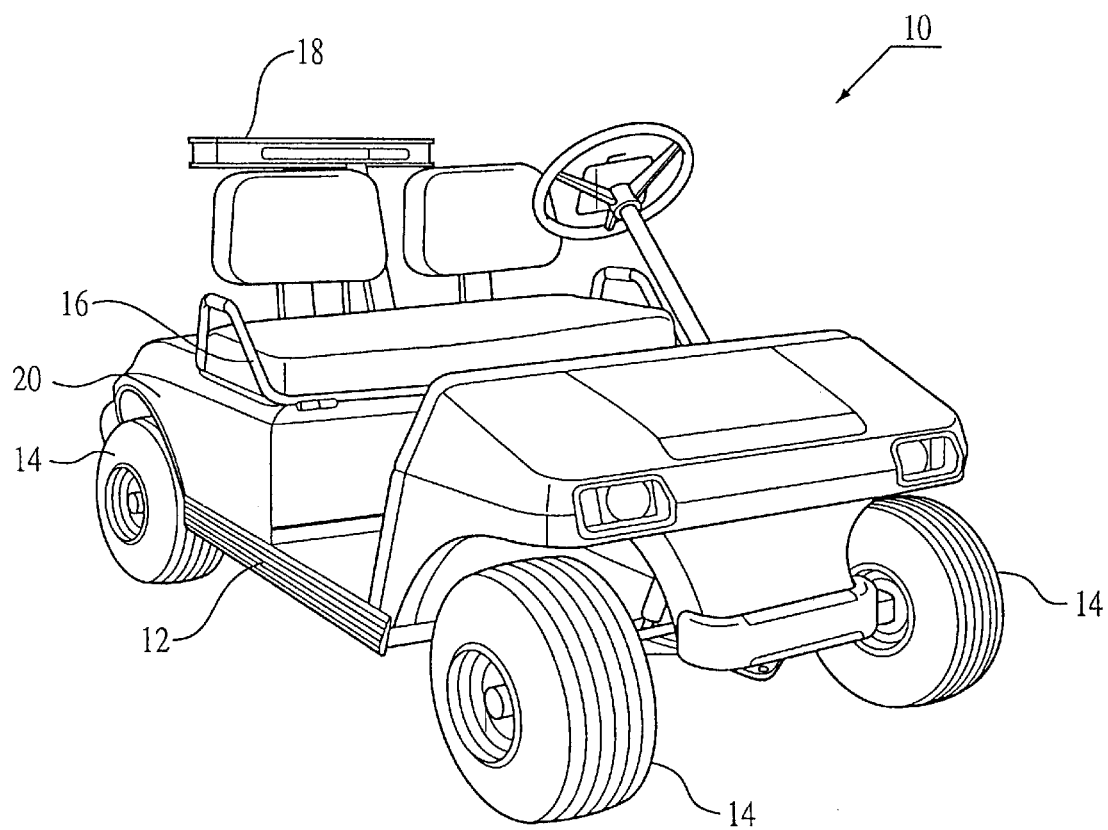
FIG. 1 is a front perspective view of a golf car of a type in which the drive train support member and suspension arrangements in accordance with the present invention are advantageously incorporated.

Referring to the drawings, and particularly to FIG. 1 thereof, there is shown a small, two-passenger golf car 10, to which the present invention is particularly applicable. Golf car 10 includes a body 12 supported on four wheels 14 (only three of which are visible in FIG. 1) and has a seat 16 to accommodate two persons and a golf bag support 18 for receiving and holding one or more golf bags (not shown). A gasoline engine (not shown) is mounted at the rear of car 10 as a part of a rear wheel drive system, and a rear body panel 20 overlies the rear portion of car 10 to cover the engine and associated drive train, and also to support the seat 16 for the driver and a passenger, as well as the golf bag support 18.

Figure 2:
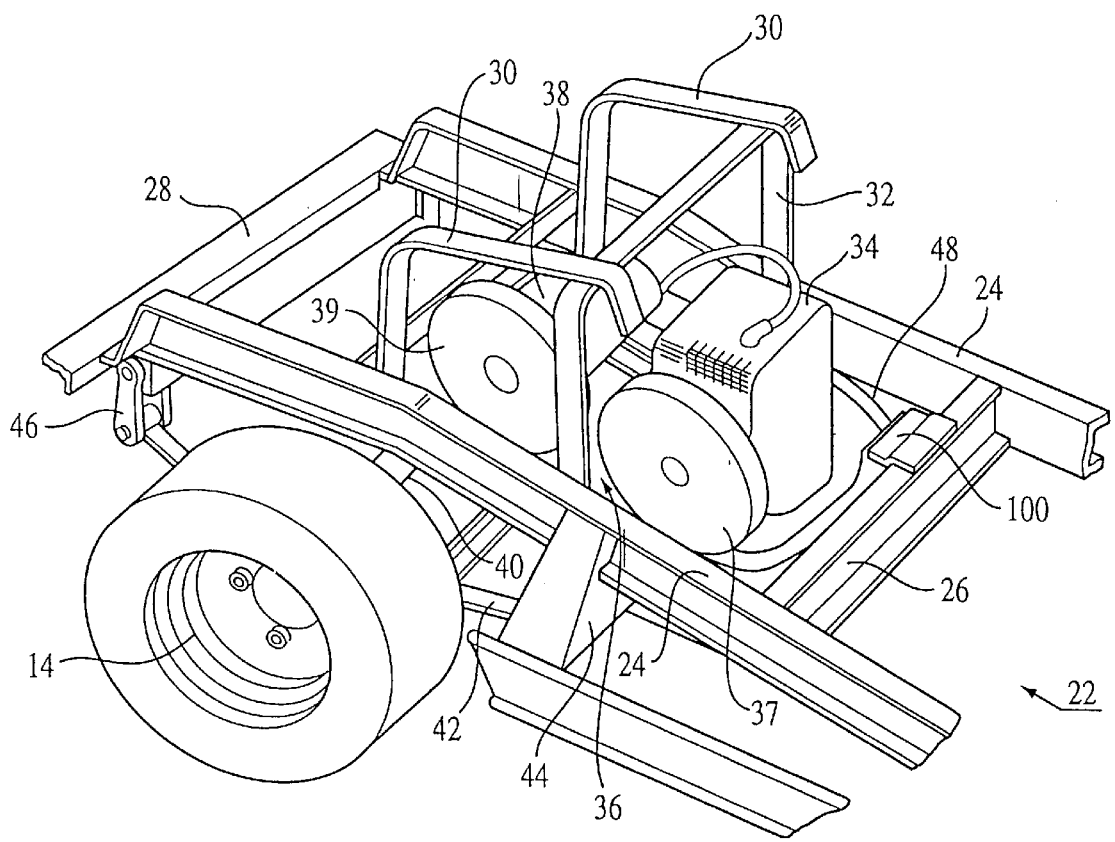
FIG. 2 is a fragmentary side perspective view of the rear portion of the vehicle shown in FIG. 1 with the body panels removed to expose the frame and engine compartment.

FIG. 2 shows the rear portion of golf car 10 after rear body panel 20 has been removed. Golf car 10 includes a frame 22 defined by a pair of longitudinally extending, transversely spaced primary side rail members 24 that extend from the front of the car (not shown) to the rear of the car. An intermediate cross member 26 is positioned near the vehicle midpoint and connects with each of the primary side rail members 22. A rear cross member 28 interconnects the rearmost ends of the respective primary side rail members 22. Extending upwardly from each of primary side rail members 22 at a point adjacent a rear wheel 14 is an inclined, upstanding rear body panel support 30, each of which connects at its forwardmost end with a U-shaped transverse support member 32 connected with and extending upwardly from the respective side rail members 22. As shown in FIG. 2, the rear portion of golf car 10 houses a gasoline engine 34, a power transmission 36, and a transaxle 38 including pair of axle shaft housings 40 (only one of which is visible in FIG. 2) that each connect with and house an axle (not shown) to drive a respective rear drive wheel 14. The engine, power transmission, and transaxle are shown diagrammatically in FIG. 2, but are shown in greater detail in the subsequent drawing figures (see, for example, FIGS. 7 and 8).

Each axle shaft housing 40 is suspended from frame 22 by a respective leaf spring 42 that is connected at its forward end with frame 22 at a spring support 44, and at its rearmost end with side rail member 24 by a shackle 46.

Engine 34 and transaxle 38 are supported on an engine and drive train support or carrier member 48 having the configuration illustrated in FIGS. 3 through 6. Carrier member 48 includes a substantially planar base panel 50 that is rectangular in plan view and that includes a pair of side edges 52, 54, a rear edge 56, and a front edge 58. As employed herein, the references to front and rear are relative to and correspond with the front and rear of golf car 10.

Figure 3:
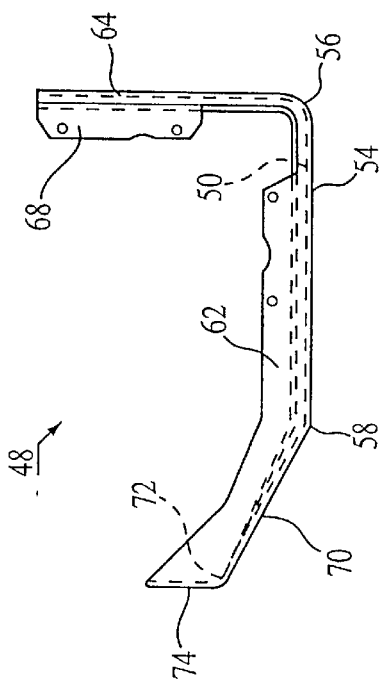
FIG. 3 is a side view of a drive train support member in accordance with the present invention.
Figure 6:
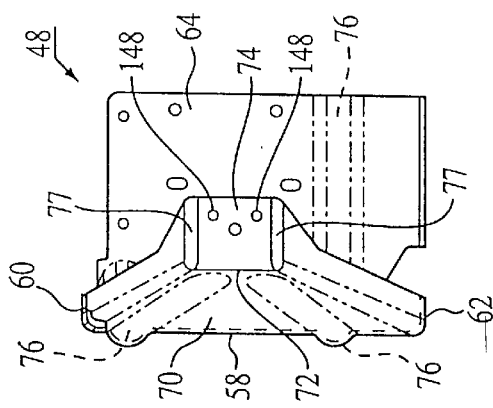
FIG. 6 is a front elevational view of the drive train support member.

Carrier member 48 includes a pair of short, upstanding side panels 60, 62 that extend along a major portion of each respective side edge 52, 54 of base panel 50. Each of side panels 60, 62 is disposed at substantially a right angle relative to the plane of base panel 50. A substantially rectangular rear panel 64 extends upwardly from the rear edge 56 of base panel 50 and includes along one vertical edge 66 thereof a short, forwardly extending support panel 68. A substantially trapezoidally-shaped transition panel 70 extends forwardly and upwardly from front edge 58 of base panel 50 and terminates at its forward edge 72 in an upstanding front panel 74 that is substantially rectangular and planar. Front panel 74 is oriented so that it is substantially parallel with rear panel 64, but it is of a significantly smaller size and area than that of rear panel 64. The upward inclination of transition panel 70 relative to base panel 50 as shown in FIG. 3 is of the order of about 25°.

Figure 5:
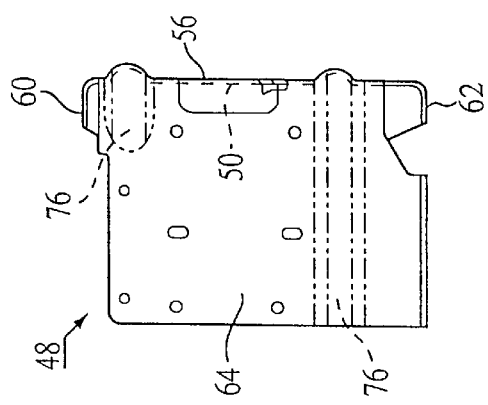
FIG. 5 is a rear elevational view of the drive train support member.
Figure 4:
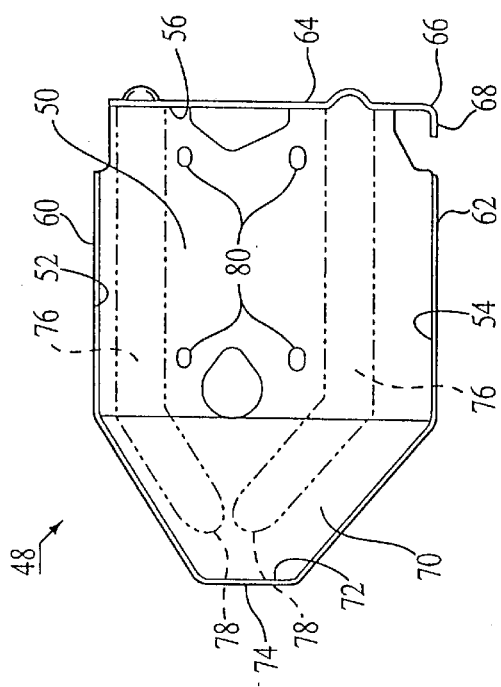
FIG. 4 is a top plan view of the drive train support member.

Preferably, side panels 60, 62 each extend from base panel 50 along transition panel 70 to front panel 74 to provide additional rigidity to the structure of carrier member 48. Additionally, a pair of elongated, depressions 76 extend parallel with and on each side of the longitudinal axis of base panel 50 to provide rigidity and increased resistance to flexure of base panel 50. Depressions 76 extend forwardly along carrier member 48 into transition panel 70, to parallel the side edges of panel 70, and terminate at respective rounded forward ends 78 without meeting or intersecting. As shown in FIG. 5, depressions 76 can also extend upwardly along rear panel 64, either completely along the vertical extent of panel 64, or only partially, as shown, to provide increased rigidity and resistance to flexure of that panel. Similarly, a pair of spaced, parallel depressions 77 are formed in front panel 74, also to provide increased flexural rigidity to that panel.

Carrier member 48 is preferably a single-piece element formed from sheet metal, preferably 7 gauge sheet steel, and can have a thickness ranging from about 0.171 inches to about 0.187 inches.

Figure 7:
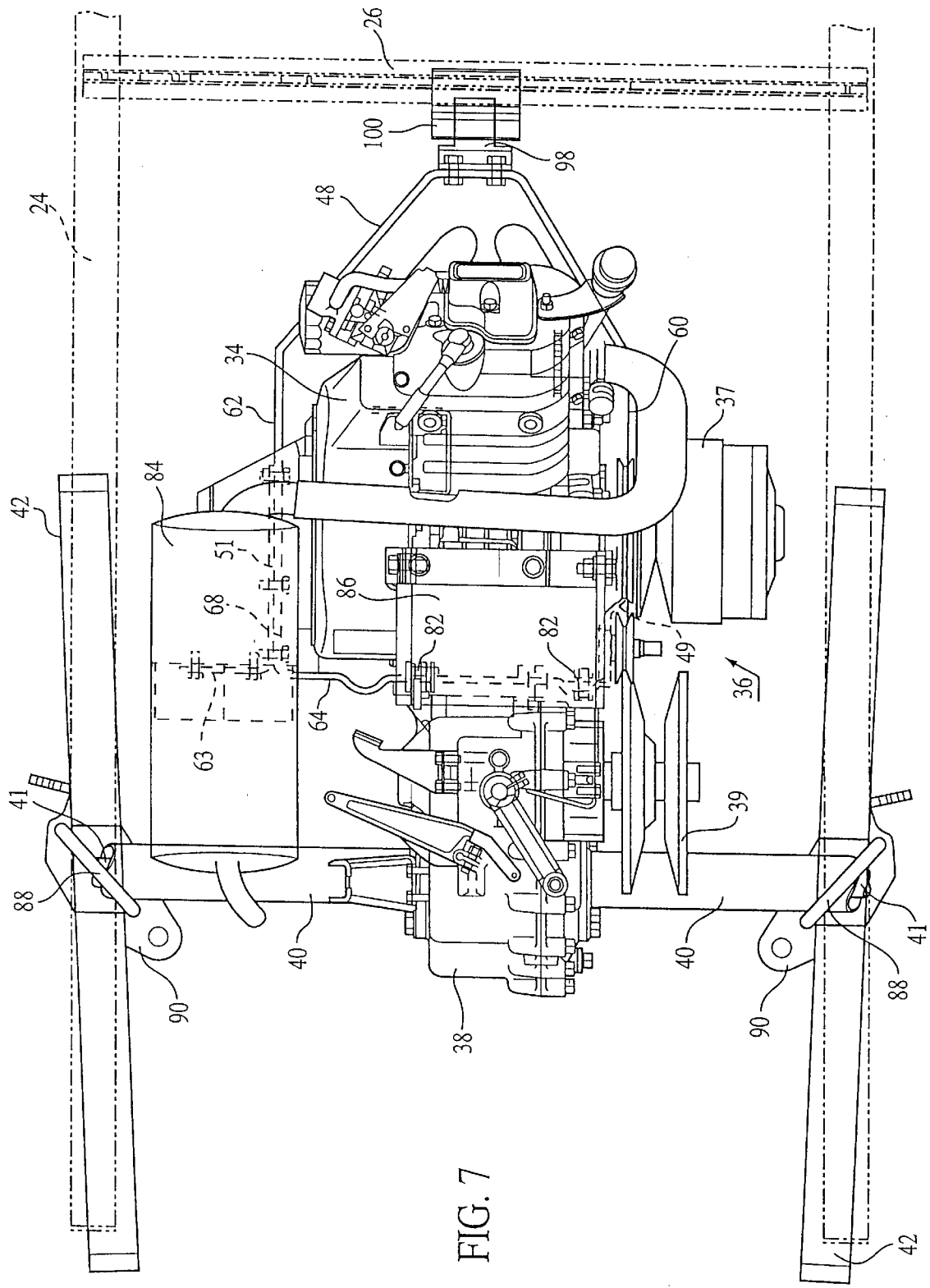
FIG. 7 is a top plan view of a vehicle drive train assembly and associated vehicle frame and suspension system incorporating a drive train support member in accordance with the present invention.
Figure 8:
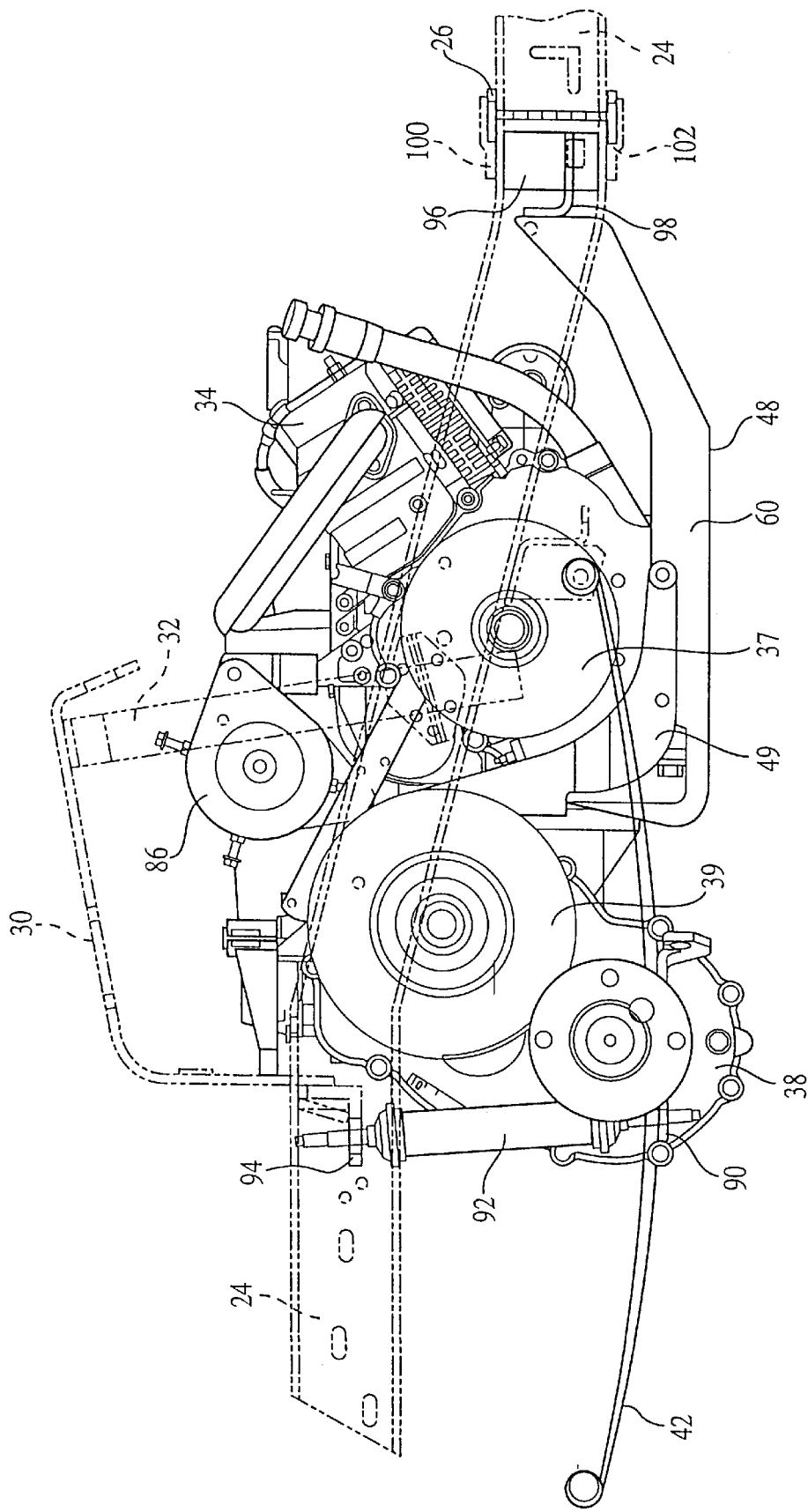
FIG. 8 is a side elevational view of the drive train assembly shown in FIG. 7.

Referring now to FIGS. 7 and 8, carrier member 48 is shown positioned in the engine compartment of golf car 10, between frame side rail members 24 and rearwardly of intermediate cross member 26 to support several components of the vehicle drive train. Engine 34, which as shown is a single cylinder, nine or eleven horsepower, four-stroke-cycle gasoline engine, is mounted to base panel 50 of carrier member 48 by bolts (not shown) that extend from the engine casing and pass through engine positioning apertures 80 provided in base panel 50 (see FIG. 4), and onto which nuts (not shown) are threaded to rigidly and securely retain engine 34 on carrier member 48. Engine 34 is also mounted at the rear by two studs that extend from the rear face of the engine and through a suitable transaxle mounting flange (not shown). The disclosed mounting arrangement provides a direct, rigid connection between the engine casing and the carrier member, without interposed or intervening elastic bushings or spacer members that can deteriorate with use of the vehicle or over time and that otherwise would need to be replaced to prevent engine vibration and possible rattling noises. Additionally, except for engine positioning apertures 80 and engine oil drain plug access opening 81, base panel 50 preferably defines a substantially continuous shield that protects the engine casing from making contact with rocks, stones, or uneven terrain when the vehicle is in operation.

Transaxle 38 includes a gearbox (not shown) within the casing of transaxle 38. The gearbox serves to transfer engine output torque to the rear drive wheels of car 10. The casing of transaxle 38 is directly and rigidly bolted to rear panel 64 of carrier member 48 by bolts 82, and preferably without intervening elastic bushings or spacers. A continuously variable, belt-type power transmission 36 is provided to transfer power from engine to transaxle. Power transmission 36 includes a centrifugal clutch 37, connected with the engine output shaft (not shown), that can have the structure shown and described in U.S. Pat. No. 4,826,467, which issued on May 2, 1989, to Terry L. Reese and James R. Kerlin, assignors to Club Car, Inc., the disclosure of which is incorporated herein by reference to the same extent as if fully rewritten. Clutch 37 constitutes a variable width drive pulley that is operatively coupled through a drive belt (not shown) with a variable width driven pulley 39 carried by transaxle 38, to vary the speed and torque delivered to driven pulley 39, depending upon vehicle speed and load conditions.

Carrier member 48 includes a first, L-shaped side stiffener member 49 that extends between and is bolted to each of side panel 60 and rear panel 64, to increase the rigidity of the carrier member. Stiffener member 49 includes a pair of legs disposed in an L, the vertically-extending leg having a tab that extends inwardly of the carrier member to permit stiffener member 49 to be bolted to rear panel 64. Similarly, a second, L-shaped side stiffener member 51 extends between and is bolted to each of side panel 62 and support panel 68. Second stiffener member 51 includes a pair of legs disposed in an L, the vertically-extending leg having a tab that extends outwardly of the carrier member and to which a muffler support bracket 63 is bolted to support an engine exhaust muffler 84, which is also connected with engine 34 by an exhaust pipe, thereby rigidly supporting the muffler on the engine and drive train assembly, rather than from the vehicle frame. First and second side stiffener members 49 and 51 can thus support suitable brackets to carry engine accessories, and they also serve to prevent bending and vibration of rear panel 64 of carrier member 48 about rear edge 56 of base panel 50.

Together, engine 34 and attached muffler 84 and attached starter-generator 86, power transmission 36, and transaxle 38, when attached to carrier member 48, define a unitized drive train that can be removed from car 10 as a unit, if desired, for ease of servicing and maintenance of the several components of the drive train. In addition to being rigidly and securely bolted to carrier member 48, engine 34 and transaxle 38 are rigidly and securely bolted to each other to provide a rigid, unitary vehicle power drive train.

Transaxle 38 includes a pair of axle shafts 41 enclosed within respective tubular axle shaft housings 40. Each of axle shafts 41 is connected with a respective rear wheel 14 of car 10 to render those wheels drive wheels for causing the car to move when power is applied to the axle shafts 41 from engine 34 through power transmission 36 and transaxle 38.

Transaxle 38 is supported from frame 22 of car 10 by a pair of leaf springs 42 that are connected with frame 22 in the manner illustrated in FIG. 2. Axle shaft housings 40 are secured to the respective springs 42 by U-bolts 88 that pass over axle shaft housings 40, around the sides of springs 42, and through bolt holes provided in a lower shock absorber mounting bracket 90. The ends of the legs of the U-bolts are threaded to receive nuts for tightening the axle-spring assembly. A pair of hydraulic shock absorbers 92 are connected between the respective lower shock absorber mounting brackets 90 and respective upper shock absorber mounting brackets 94 connected with side rail members 24. The transaxle housing and the axle shaft housings 40, in conjunction with engine plate 48, are stress-carrying members of the drive train assembly, to avoid imposing on the engine casing excessive inertially-induced stresses that result from vehicle movement over uneven terrain.

As best seen in FIG. 8, front panel 74 of carrier member 48 supports a generally circular grommet 96 that is carried by a forwardly-extending, L-shaped tongue 98 that is secured to front panel 74. Grommet 96 is received between a pair of vertically spaced plates 100, 102 that are secured to respective upper and lower surfaces of transverse cross member 26 to define a forward mount for the drive train assembly. The structural details of the front mount and its connection with the vehicle frame, including the grommet and the grommet supporting structure carried by the frame, are described more fully in the engine support member patent earlier referred to above (U.S. Pat. No. 4,821,827), the disclosure of which is hereby incorporated herein by reference top the same extent as if fully rewritten.

Figure 9:
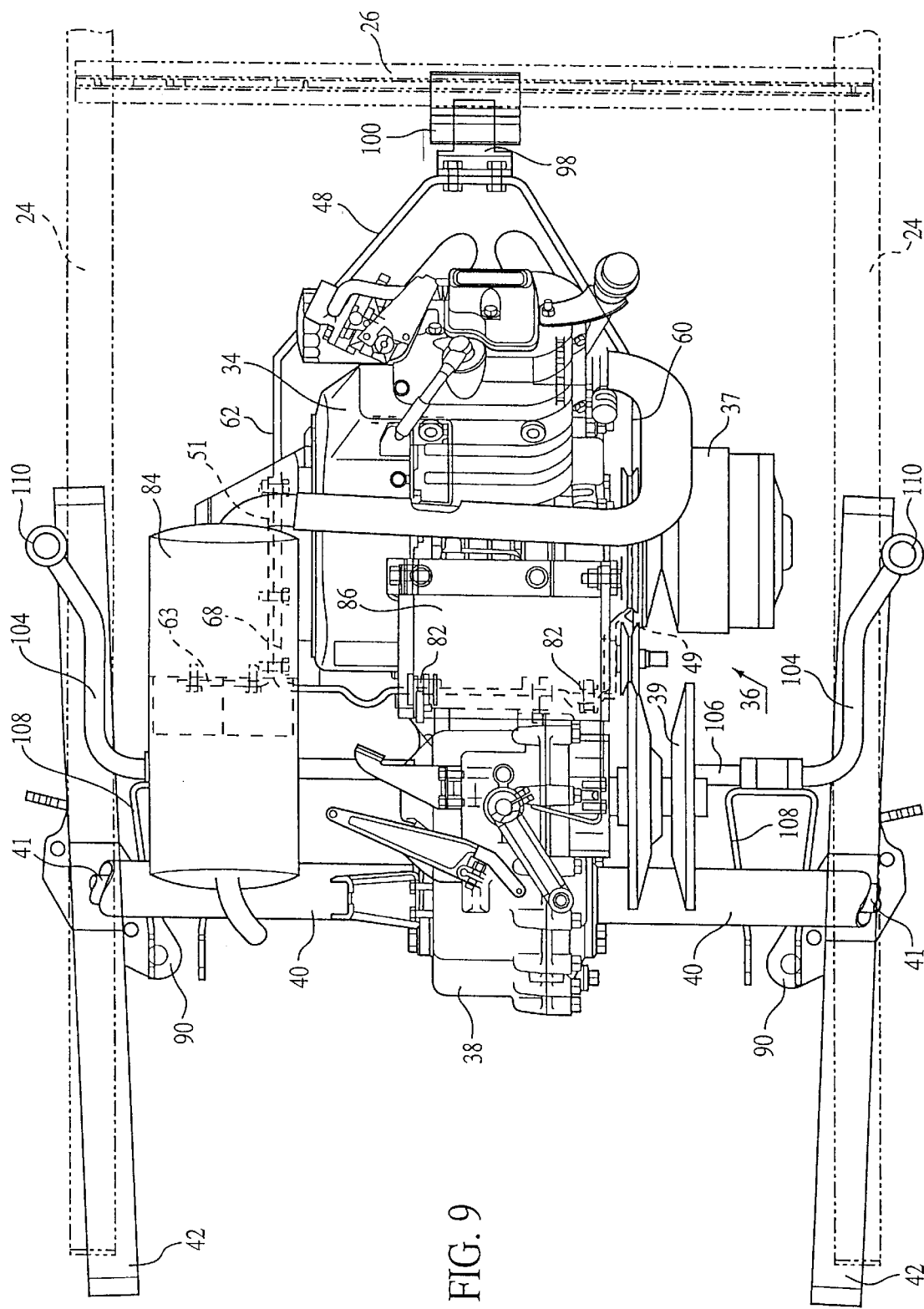
FIG. 9 is a top plan view, similar to that of FIG. 7, of a second embodiment of a vehicle suspension system, including an anti-roll bar.
Figure 10:
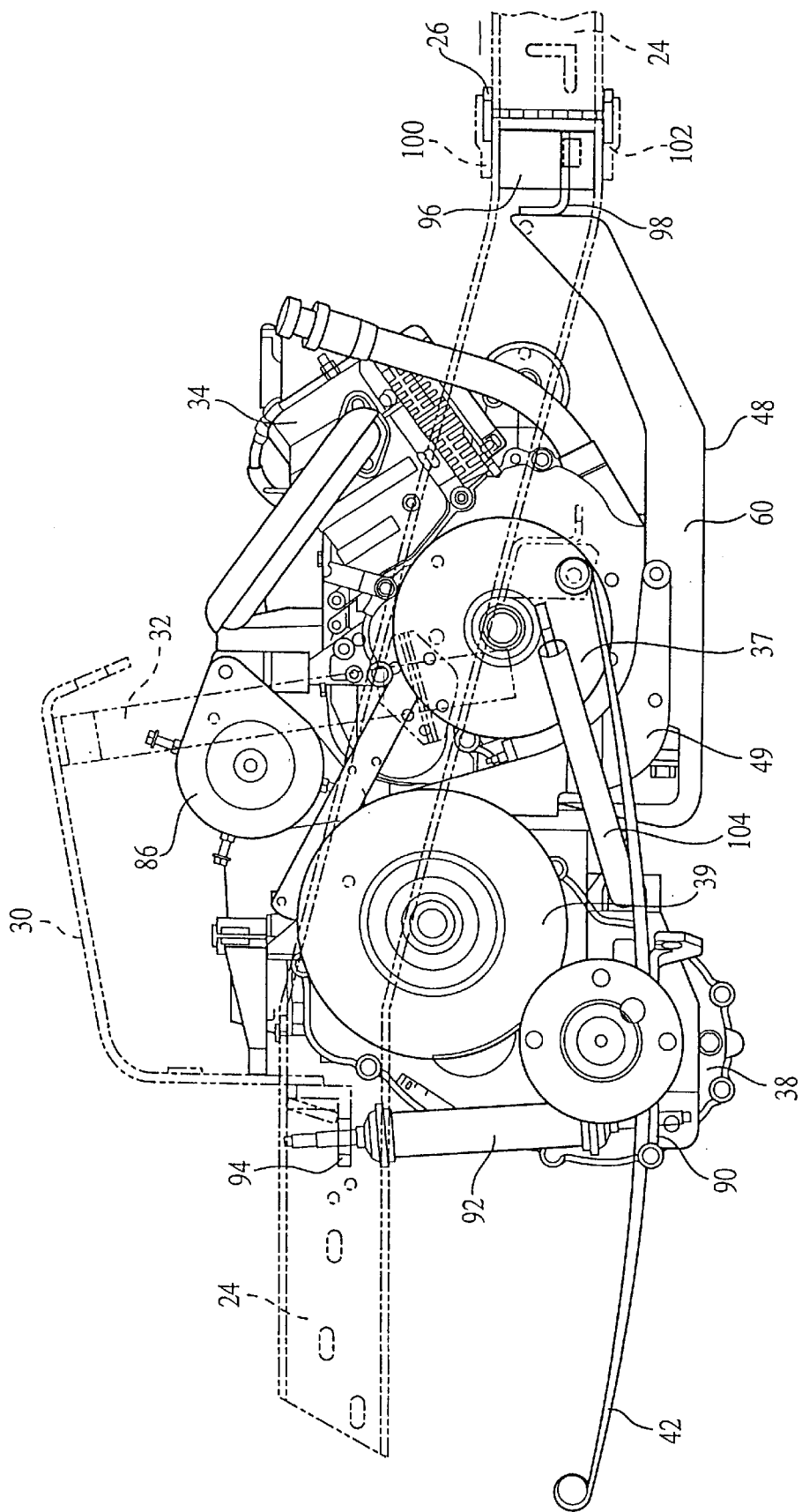
FIG. 10 is side elevational view, similar to that of FIG. 8, of the second suspension system embodiment shown in FIG. 9.

Another embodiment of a suspension system for a drive train assembly utilizing carrier member 48 is shown in FIGS. 9 and 10. That embodiment is structurally similar to the embodiment of FIGS. 7 and 8 except that it incorporates a torsion bar 104 that extends transversely across and connects with frame 22 at a connection (not shown) with side rail members 24. Torsion bar 104 is a steel bar having a diameter of about ¾ inches that includes a linear intermediate portion 106 that extends substantially parallel with axle shaft housings 40 and is supported therefrom by a pair of transversely spaced torsion bar support brackets 108 that are welded to respective axle shaft housings 40. The outer ends of torsion bar 104 each curve toward the front of car 10 and terminate in a loop 110 through which connecting bolts (not shown) pass to connect the ends of torsion bar 104 to torsion bar mounts (not shown) carried by the respective side rail members 24. Torsion bar 104 serves as an anti-roll bar to provide added vehicle roll stability, by limiting car body tilt or roll when the car is cornering, especially when the car is heavily loaded.

Figure 11:
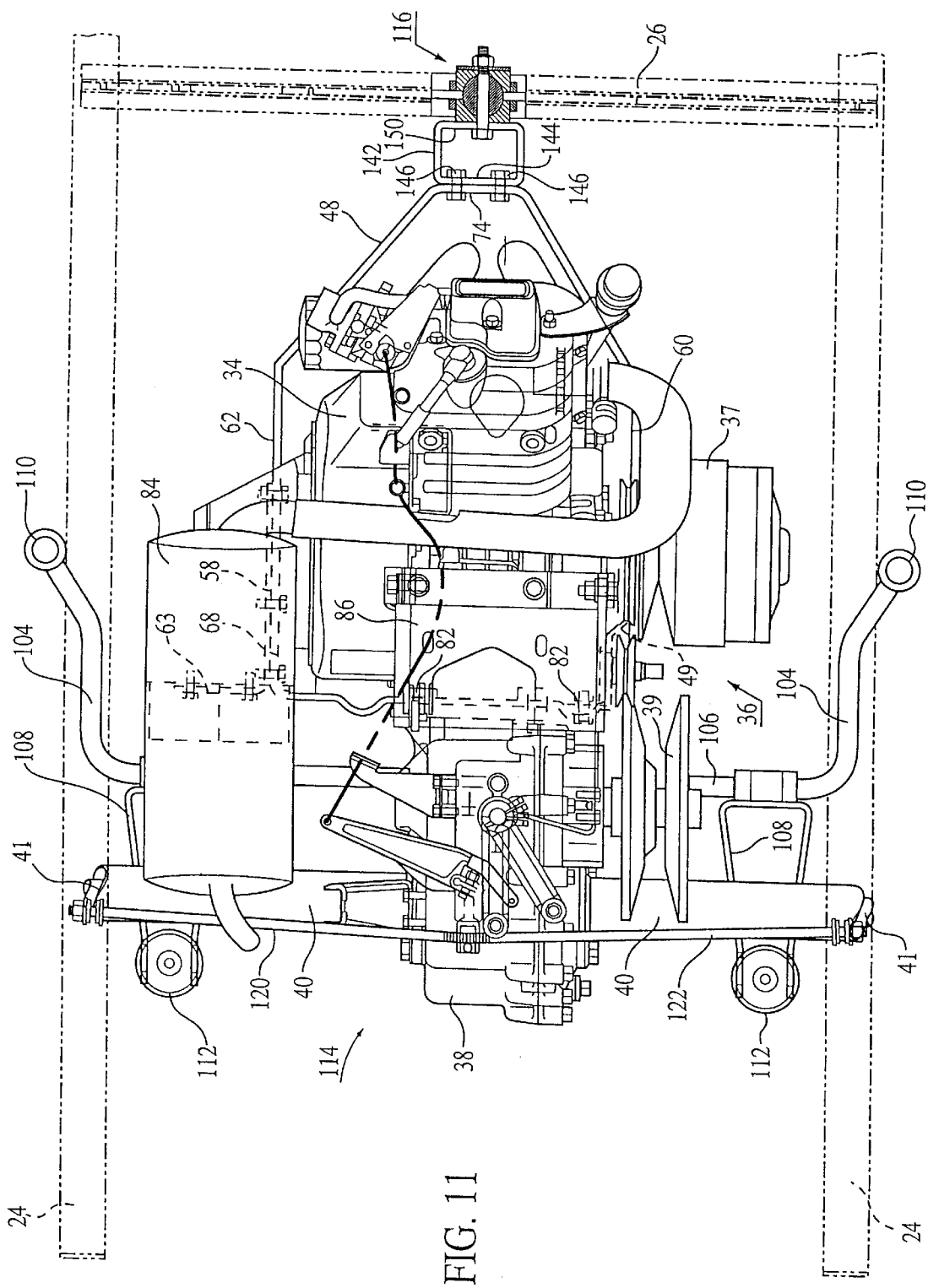
FIG. 11 is a top plan view of a third embodiment of a vehicle suspension system, and incorporating a Watts link and a ball-type front mount.
Figure 12:
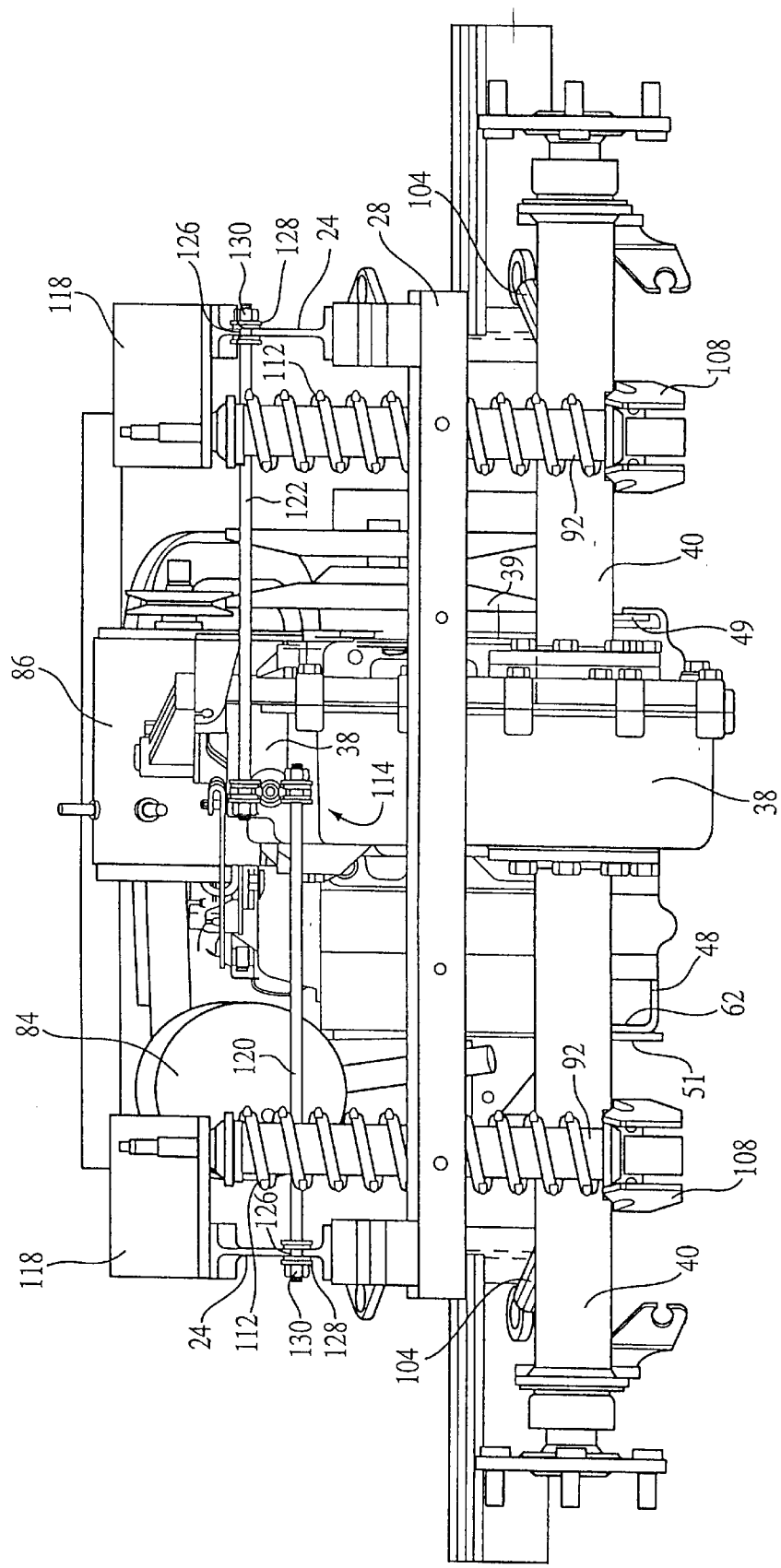
FIG. 12 is a rear elevational view of the embodiment shown in FIG. 11.
Figure 13:
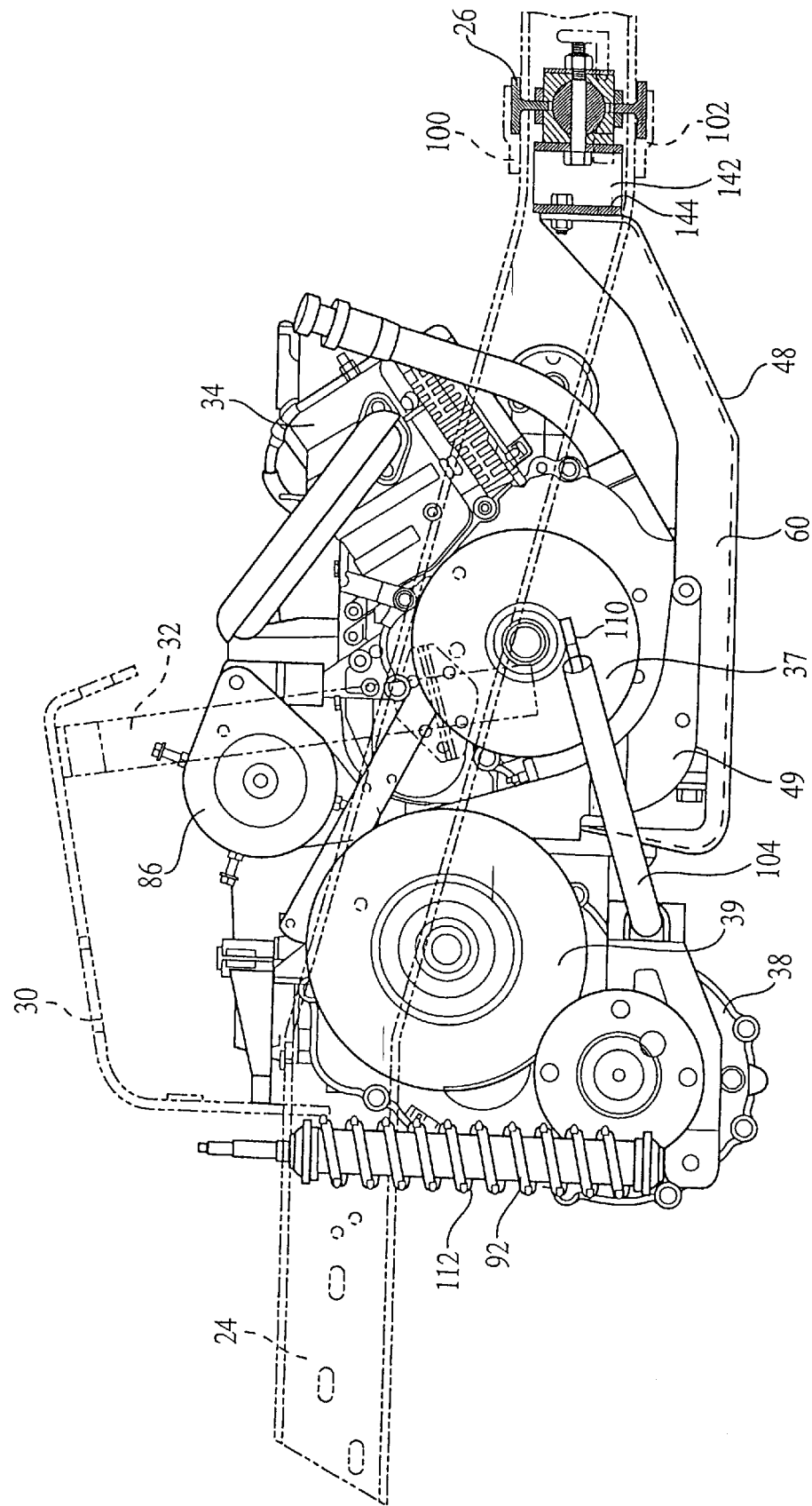
FIG. 13 is a side elevational view of the embodiment shown in FIG. 11.

A further embodiment of a suspension system in accordance with the present invention is shown in FIGS. 11 through 13. That embodiment is similar to the preceding embodiment (FIGS. 9 and 10) except that a coil spring 112 is substituted for each of the leaf springs 42 that are included in the embodiment of FIGS. 9 and 10. Additional differences between those two suspension system embodiments involve the inclusion in the FIGS. 11 through 13 embodiment of a Watts link arrangement 114 that is provided between side frame members 24 and the drive train assembly carried by carrier member 48, and also the inclusion in the FIGS. 11 through 13 embodiment of a ball joint 116 at the forward connection between drive train carrier member and 48 intermediate cross member 26.

Coil springs 112 are supported between respective torsion bar support brackets 108 and an L-shaped upper coil support member 118 that is secured to and extends inwardly from the respective side rail members 24. As best seen in FIG. 12, shock absorbers 92 are disposed coaxially within coil springs 112.

The Watts link arrangement 114 includes a pair of links 120, 122 of equal length that extend laterally inwardly from respective side rail members 24 to a centrally-positioned, vertically-extending connecting link 124. Referring to FIG. 12, each of side rail members 24 includes an aperture 126 through which respective links 120, 122 pass. A resilient, flexible grommet 128 is positioned within each of the apertures to permit the outermost ends of the links to move slightly in a vertical direction, because of the resilience of the grommets. A lock nut 130 is applied to the outermost, threaded ends of the respective links 120, 122 to limit inward movement of the links, which are capable of slight movement in an axial direction, because of the resilience of grommets 128.

Figure 14:
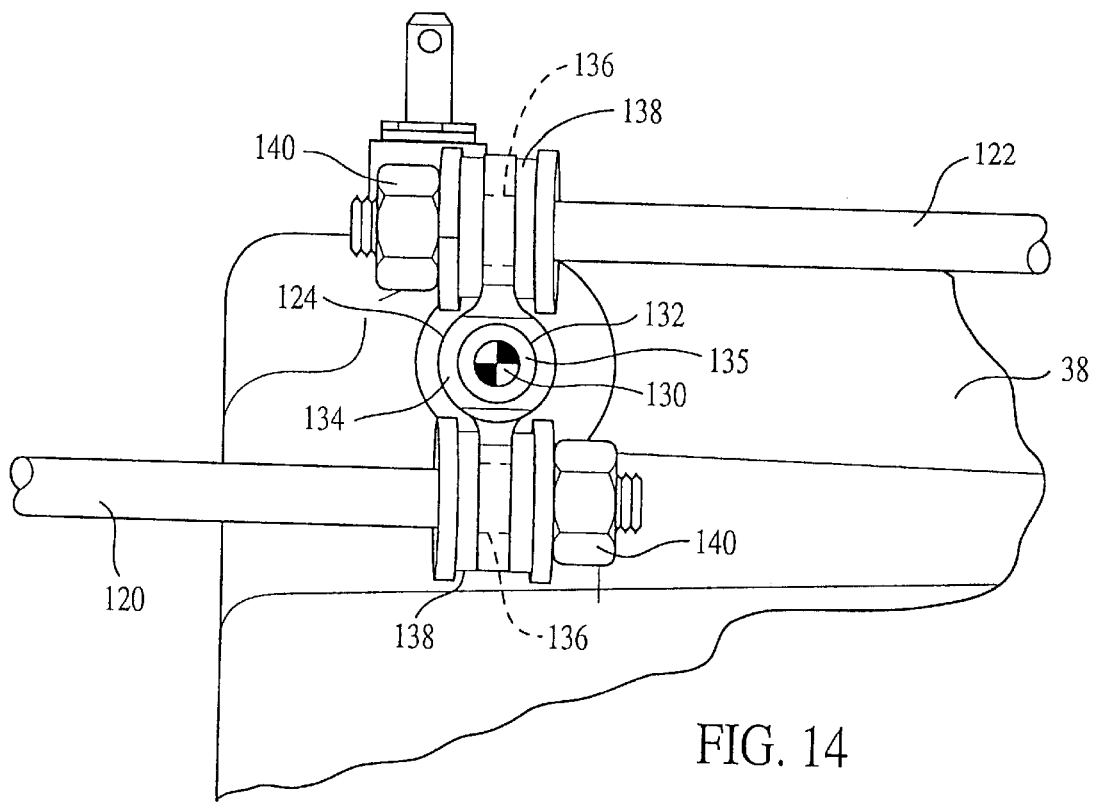
FIG. 14 is an enlarged, fragmentary elevational view of the Watts link element of the embodiment shown in FIG. 11.

Referring to FIG. 14, connecting link, or Watts link, 124 is positioned opposite from and between side rail members 24. Link 124 is pivotally carried by the drive train assembly, which includes a rearwardly extending pin 130 that extends horizontally outwardly and rearwardly from the casing of transaxle 38 to define a horizontal pivot axis. Pin 130 passes through a centrally positioned bore 132 in connecting link 124 to support link 124 for pivotal movement. As also shown in FIG. 14, connecting link 124 includes a hub 134, through which bore 132 passes to receive a spacer sleeve 135, and a pair of loops each containing a bore 136, one loop extending upwardly from hub 134 and the other extending downwardly therefrom, to define a figure eight when connecting link 124 is viewed from the side. Loop bores 136 each have their respective axes parallel with each other and oriented in a direction that is perpendicular to the axes of pin 130 and of aperture 132 to enable the loops to receive the innermost ends of links 120 and 122. A resilient, flexible grommet 138, or the like is provided at the connections of links 120, 122 and connecting link 124. The inner ends of each of links 120, 122 carry a locking nut 140 to fix the positions of the respective links relative to connecting link 124.

The Watts link arrangement operates to allow upward movements of the drive train assembly and to confine that movement in a substantially straight, vertical line, to thereby maintain the drive train assembly substantially centered relative to the vehicle longitudinal centerline. The result of utilizing the Watts link arrangement herein described is to reduce the transfer to the vehicle body of side-to-side drive train motions that ordinarily result when the vehicle passes over bumps and other uneven terrain of the type frequently found on golf courses, thereby providing a more comfortable ride for the vehicle occupants.

Figure 15:
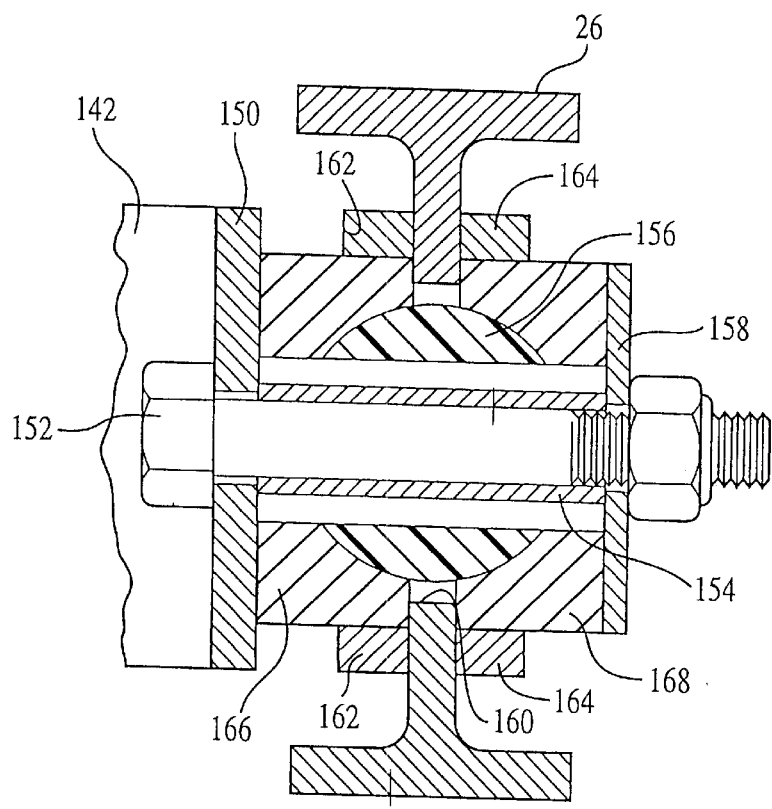
FIG. 15 is an enlarged, vertical cross-sectional view of the ball-type front mount shown in FIGS. 11 and 13.

The forward connection of the drive train carrier member 48 with the car frame 22 in the suspension system embodiment shown in FIGS. 11 through 13 is effected through a ball joint structure having a configuration of the character shown in FIGS. 11, 13, and 15. A rigid, tubular steel sleeve member 142 having a rectangular cross section is positioned with its central axis disposed substantially vertically, and is positioned between front panel 74 of carrier member 48 and intermediate cross member 26. One side panel 144 of sleeve member 142 is secured to the forward face of front panel 74 as by bolts 146 that extend through apertures 148 in front panel 74 (see FIG. 6). As best seen in FIG. 15, side panel 150 of sleeve member 142, which is opposite from side panel 144, includes an aperture to receive connecting bolt 152 that passes through side panel 150, through a rigid tubular spacer sleeve 154 that passes diametrically through a plastic ball element 156, and against an end wall element defined by a flat, annular washer 158. Ball element 156 is received within an aperture 160 formed in intermediate cross member 26, which, as shown, is preferably in the form of an I-beam. Aperture 160 is larger in diameter than the diameter of ball element 156, and a pair of isolator guide rings 162, 164 of circular form are secured to each of the front and rear sides of intermediate cross member 26 to surround and limit vertical and horizontal components of movement of a pair of generally hemispherical isolator members 166, 168 that surround and engage the outer surface of ball element 156 on opposite sides of cross member 26. Isolator members 166, 168 and associated guide rings 162, 164, respectively, serve to space ball element 156 from the edge of aperture 160 to prevent the transmission to the frame of vibrations of the drive train assembly.

Figure 16:
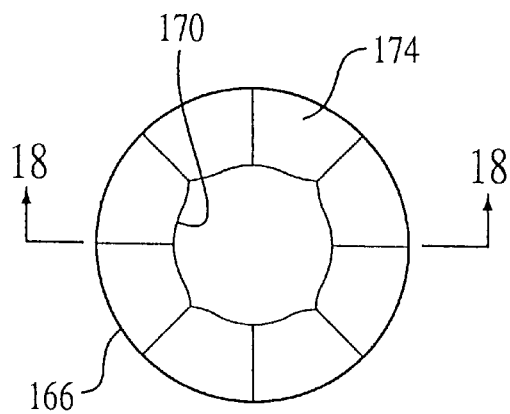
FIG. 16 is a top plan view of an isolator cushion forming part of the ball-type front mount shown in FIG. 15.
Figure 17:
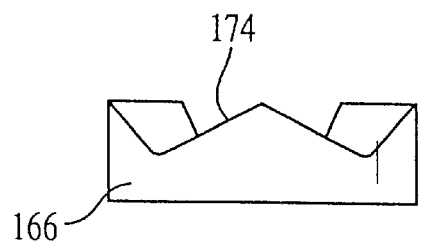
FIG. 17 is an end elevational view of the isolator shown in FIG. 16.
Figure 18:
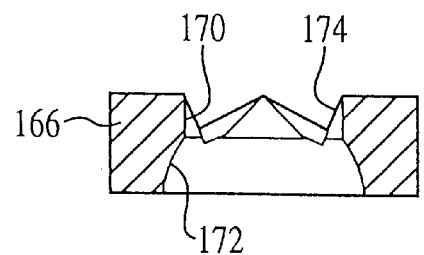
FIG. 18 is cross-sectional view of the isolator taken along the line 18—18 of FIG. 16.

FIGS. 16, 17, and 18 show the configuration of isolators 166, 168, which preferably are formed from a resilient material, such as a polyurethane elastomer, preferably having a durometer value of from about 50 Shore A to about 70 Shore A. Isolators 166, 168 are each ring-like structures having a central aperture 170 to permit spacer sleeve 154 and connecting bolt 152 to pass therethrough. Additionally, isolators 166, 168 have an annular inner ring surface 172 of spherical shape to engage the surface of and to position ball element 156. Because of their resilience, isolators 166, 168 permit a slight degree of movement of ball element 156 relative to cross member 26. Isolators 166, 168 also include an outer ring surface 174 that is, as shown, of a sawtooth configuration in side view, to provide progressively increasing resistance to compression when the front mount is assembled and connecting bolt 152 is tightened.

The front mount structure hereinabove described operates to permit pivotal movement of the drive train assembly relative to cross member 26, and to absorb, and through isolators 166, 168, to substantially isolate from the vehicle frame all fore-and-aft, side-to-side, up-and-down, and rotational drive train inertial forces and vibrations that result when the vehicle is in motion, -particularly when the vehicle is accelerating, lurching, or proceeding over uneven terrain. Consequently, any such drive train inertial forces are transmitted in reduced magnitude to the vehicle frame, through resilient isolators 166, 168, thereby resulting in a more comfortable ride for the vehicle occupants.

Figure 19:
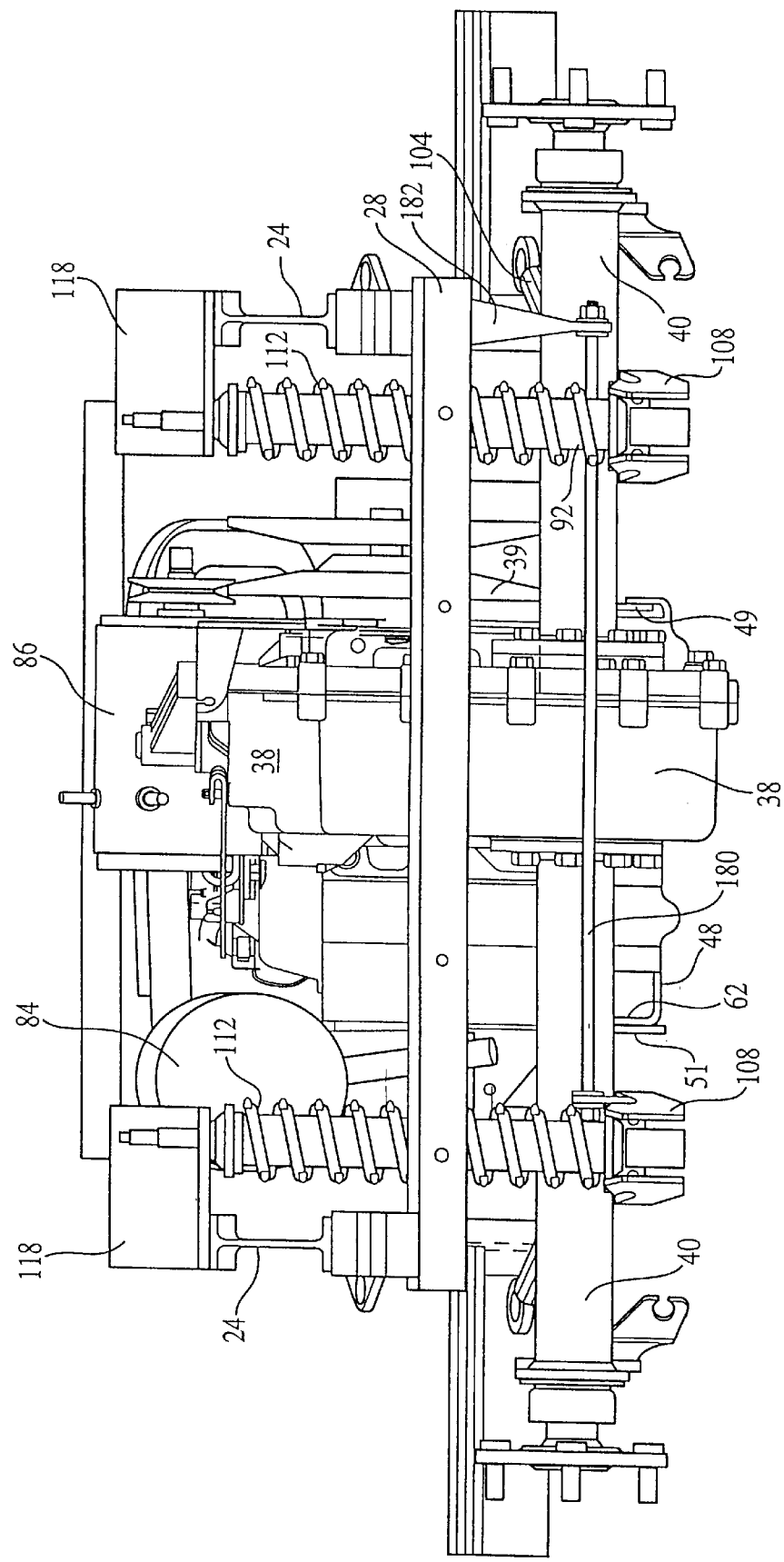
FIG. 19 is a rear elevational view of another embodiment of the present invention including a transverse link member instead of the Watts link arrangement shown in FIGS. 11 through 13.
Figure 20:
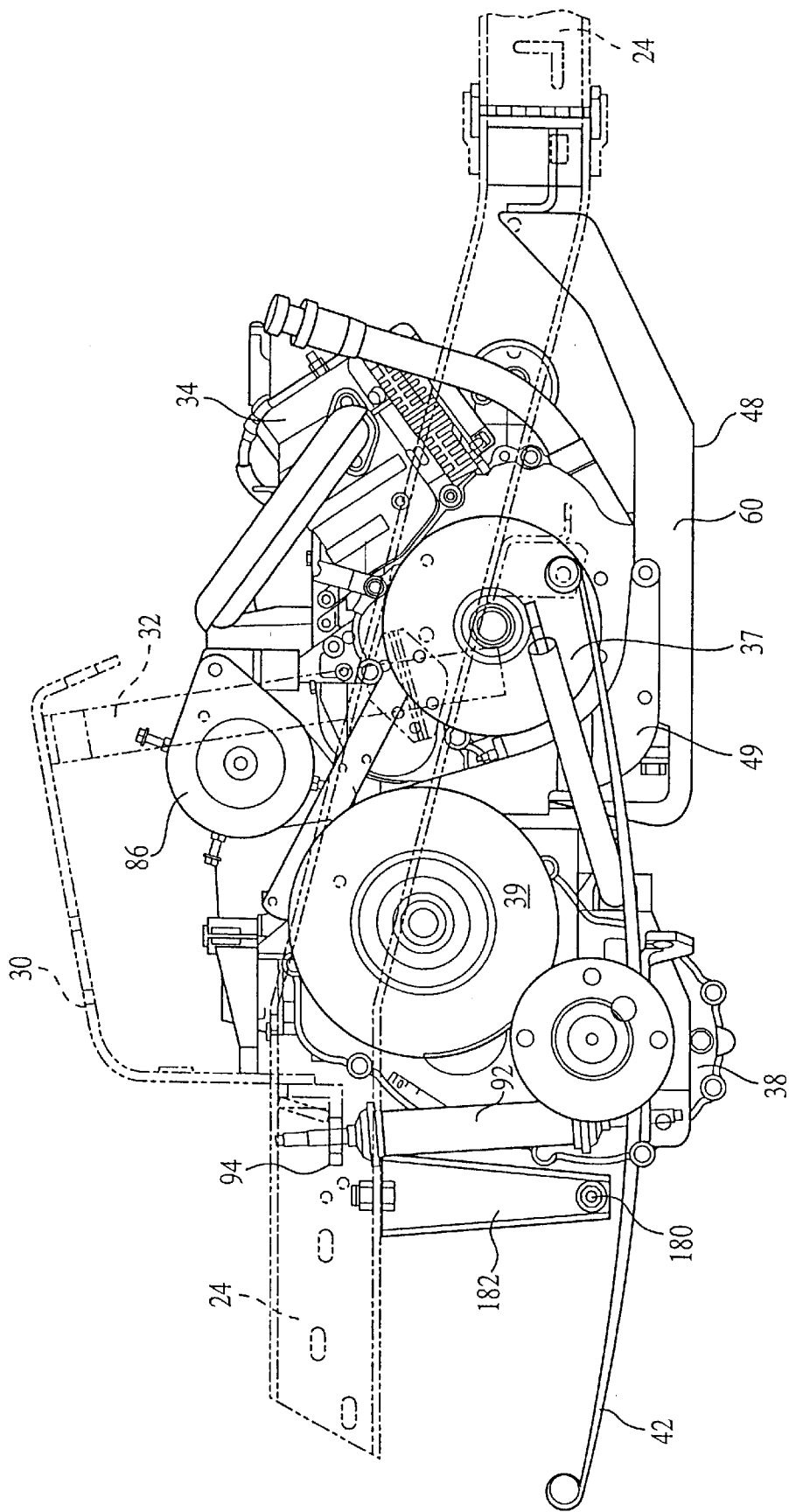
FIG. 20 is a side elevational view of the embodiment shown in FIG. 19.
Figure 21:
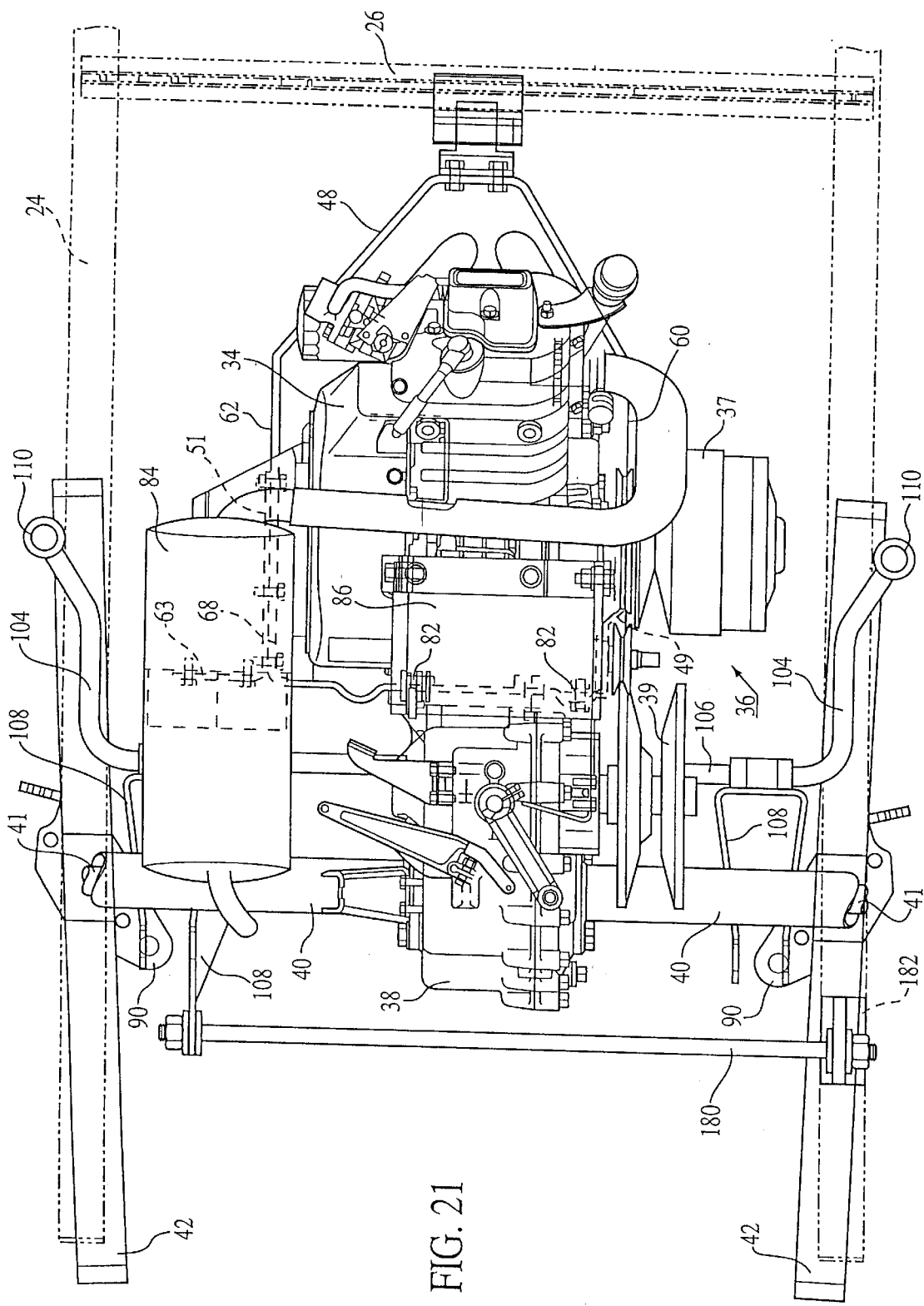
FIG. 21 is a top plan view of the embodiment shown in FIG. 19.

Referring to FIGS. 19 through 21, the embodiment there shown is similar structurally to that shown in FIGS. 11 through 13, except that the Watts link arrangement has substituted for it a transverse radius rod 180, sometimes called a Panhard link. As best seen in FIG. 19, radius rod 180 extends between one of support brackets 108 and rear cross member 28 at a point on the opposite side of the vehicle from support bracket 108. As shown, radius rod 108 extends from the left support bracket 108 to the right end of rear cross member 28, although if desired it could instead extend from the right support bracket 108 to the left end of rear cross member 28. The connection with rear cross member 28 is through a downwardly depending bracket 182. At each end of radius rod 180 is a grommet and lock nut arrangement similar to that described above with respect to the ends of links 120, 122 forming part of the Watts link arrangement. Radius rod 180 serves to limit transverse movement of the drive train assembly during operation of the vehicle, and thereby reduce the amplitude of side-to-side drive train motions and vibrations that would otherwise be transferred to the vehicle frame.

The drive train assembly front mount structure shown in FIGS. 19 through 21 corresponds structurally and functionally with the front mount shown in the embodiments illustrated in FIGS. 7 through 10. However, it will be appreciated that the front mount structure shown in FIGS. 11, 13, and 15 can be substituted for the structure shown.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. An engine support member for supporting an engine and transaxle of a gasoline-engine-powered vehicle, said support comprising:
   a. a base panel including means for receiving and mounting a gasoline engine;
   b. a first end panel extending transversely from a first end of the base panel in a first direction, the end panel including mounting means for receiving and mounting a transaxle adapted to be operatively connected with the engine;
   c. a second end panel extending transversely from a second end of the base panel substantially in the first direction and spaced from the first end panel, the second end panel including mounting means for receiving and mounting a vibration-isolating mount for connection with a vehicle frame.

2. An engine support member in accordance with claim 1 wherein the base panel is substantially rectangular.

3. An engine support member in accordance with claim 1 including a support panel extending from the first end panel in a direction toward the second end panel and disposed in a transverse direction relative to the base panel.

4. An engine support member in accordance with claim 3 including mounting means for connecting an engine exhaust muffler to the engine support member.

5. An engine support member in accordance with claim 1 wherein the engine support member is a unitary structure.

6. An engine support member in accordance with claim 5 formed from sheet metal having a thickness of about 0.180 inches.

7. An engine support member in accordance with claim 1 including a pair of side panels extending transversely from respective longitudinal edges of the base panel.

8. An engine support member in accordance with claim 7 including a first stiffener member extending between and connected with one of said pair of side panel members and the first end panel.

9. An engine support member in accordance with claim 8 including a second stiffener member extending between and connected with the other one of said pair of side panel members and the first end panel.

10. A vehicle drive train suspension for supporting an engine and transaxle relative to a vehicle frame comprising:
    a. an engine and interconnected transaxle each connected with and carried on a drive train support member, the support member including a base panel having means for receiving and mounting a gasoline engine, a first end panel extending transversely from a first end of the base panel in a first direction, the end panel including mounting means for receiving and mounting a transaxle adapted to be operatively connected with the engine, a second end panel extending transversely from a second end of the base panel substantially in the first direction and spaced from the first end panel, the second end panel including mounting means for receiving and mounting a vibration-isolating mount for connection with a vehicle frame connection; and
    b. spring means extending between the vehicle frame and the transaxle for resiliently suspending the engine and transaxle from the vehicle frame.

11. A vehicle drive train suspension in accordance with claim 10 wherein the spring means includes a leaf spring.

12. A vehicle drive train suspension in accordance with claim 11 including a torsion bar extending transversely of the vehicle longitudinal centerline and connected with the drive train suspension and with the vehicle frame for limiting vehicle body roll during vehicle movement.

13. A vehicle drive train suspension in accordance with claim 10 wherein the spring means includes a coil spring.

14. A vehicle drive train suspension in accordance with claim 13 including a torsion bar extending transversely of the vehicle longitudinal centerline and connected with the drive train suspension and with the vehicle frame for limiting vehicle body roll during vehicle movement.

15. A vehicle drive train suspension in accordance with claim 11 including a ball joint at the front frame connection for connecting the drive train support member with the vehicle frame.

16. A vehicle drive train suspension in accordance with claim 13 including a Watts link carried by drive train, and a pair of connecting links extending from respective ends of the Watts link and the vehicle frame for centering the drive train suspension relative to the vehicle longitudinal centerline and for limiting drive train suspension movement to movement in a vertical direction relative to the vehicle frame.

17. A vehicle drive train suspension in accordance with claim 13 including a transverse radius rod extending between and connected with the drive train assembly and the vehicle frame to limit the amplitude of drive train transverse movements relative to the vehicle frame.

18. A vehicle drive train suspension in accordance with claim 16 including a ball joint at the front frame connection for connecting the drive train support member with the vehicle frame.

19. A vehicle drive train suspension in accordance with claim 16 including resilient elements carried by the vehicle frame and a ball member carried by the drive train support member and received within the resilient elements to limit transfer of drive train support member vibrations to the vehicle frame.

20. A vehicle drive train suspension in accordance with claim 10 wherein the engine includes an engine casing and the engine casing is rigidly connected to the support member.

21. A vehicle drive train suspension in accordance with claim 20 wherein the engine casing is bolted to the support member without intervening elastic members.

22. A vehicle drive train suspension in accordance with claim 21 wherein the engine casing and support member are substantially incapable of relative motion therebetween.

23. A vehicle drive train suspension in accordance with claim 10 wherein the engine includes an engine casing and the transaxle includes a transaxle casing, wherein the engine casing is rigidly connected to the transaxle casing, and wherein each of the engine casing and the transaxle casing is rigidly connected to the support member.

24. A vehicle drive train suspension in accordance with claim 23 wherein the engine casing and the transaxle casing are rigidly connected to each other and each is rigidly connected to the support member without intervening elastic members.

25. A vehicle drive train suspension in accordance with claim 23 wherein the engine casing, the transaxle casing, and the support member are substantially incapable of relative motion therebetween.

26. A vehicle drive train suspension in accordance with claim 20 wherein the support member defines a substantially continuous shield to protect the engine casing from contacting rocks and uneven terrain and is oriented relative to the vehicle to be interposed between the engine casing and terrain over which the vehicle is adapted to travel.

* * * * *